(12) United States Patent
Gottzmann

(10) Patent No.: US 7,160,357 B2
(45) Date of Patent: Jan. 9, 2007

(54) OXYGEN TRANSPORT MEMBRANE REACTOR AND METHOD

(75) Inventor: Christian Friedrich Gottzmann, Clarence, NY (US)

(73) Assignee: Praxair Technology, Inc., Danbury, CT (US)

( * ) Notice: Subject to any disclaimer, the term of this patent is extended or adjusted under 35 U.S.C. 154(b) by 636 days.

(21) Appl. No.: 10/640,298

(22) Filed: Aug. 14, 2003

(65) Prior Publication Data
US 2005/0037299 A1    Feb. 17, 2005

(51) Int. Cl.
  *B01D 53/22* (2006.01)
(52) U.S. Cl. .................. 95/54; 96/6; 96/10; 60/783
(58) Field of Classification Search .............. 95/54; 96/6, 10; 60/783
See application file for complete search history.

(56) References Cited

U.S. PATENT DOCUMENTS

| | | | |
|---|---|---|---|
| 5,306,411 A | 4/1994 | Mazanec et al. ............ 204/265 |
| 5,648,304 A | 7/1997 | Mazanec et al. ............ 501/134 |
| 6,139,810 A | 10/2000 | Gottzmann et al. ......... 422/197 |
| 6,214,757 B1 * | 4/2001 | Schwartz et al. ............. 502/4 |
| 6,293,084 B1 * | 9/2001 | Drnevich et al. ............. 60/783 |

* cited by examiner

*Primary Examiner*—Robert A. Hopkins
(74) *Attorney, Agent, or Firm*—David M. Rosenblum

(57) ABSTRACT

An oxygen transport membrane reactor having an oxygen transport membrane and a downstream fuel injector located within a chamber. The oxygen transport membrane and fuel injector are enclosed by a duct that constrains an incoming oxygen containing feed to flow along the outer surface of the duct and then reverse direction and flow within the duct and past the oxygen transport membrane and then the fuel injector. The oxygen transport membrane permeates part of the oxygen within the oxygen containing feed by ion transport to form a retentate. The retentate is used to support combustion of the fuel injected by the fuel injector. The resulting heat is used to heat the incoming oxygen containing feed by indirect heat exchange which in turn is used to heat the oxygen transport membrane.

12 Claims, 2 Drawing Sheets

OXYGEN TRANSPORT MEMBRANE REACTOR AND METHOD

FIELD OF THE INVENTION

The present invention relates to an oxygen transport membrane reactor and method in which an oxygen transport membrane separates oxygen from a heated oxygen containing feed that is also used to heat the oxygen transport membrane. More particularly, the present invention relates to such an oxygen transport membrane reactor and method in which an incoming oxygen containing feed is heated indirectly by heat generated through combustion of a fuel in the presence of oxygen contained within an oxygen depleted retentate.

BACKGROUND OF THE INVENTION

Oxygen transport membranes are devices that are formed from ceramics that exhibit oxygen ion conductivity at elevated temperatures. An oxygen containing feed, for instance air, is contacted on one surface of the membrane, known as the cathode side, and becomes ionized by gaining electrons. The oxygen ions are then transported through the membrane under the impetus of an oxygen partial pressure differential to an anode side in which the oxygen ions recombine and give up electrons to form elemental oxygen.

The ceramic material forming the oxygen transport membrane can be a mixed conductor in which both oxygen ions and electrons are conducted. The electrons produced at the anode side of the membrane by the formation of elemental oxygen and are then conducted to the cathode side of the membrane to ionize the oxygen within the oxygen containing feed. In ionic conductors the ceramic material making up the oxygen transport membrane is only capable of conducting the oxygen ions. As such a separate electrically conductive pathway must be provided for the electrons. Such oxygen transport membranes can also operate by drawing externally generated power through the separate electrically conductive pathway. In dual phase conductors, an ionic conductor and a conductive metal phase are combined for transport of both the oxygen ions and electrons.

As stated previously, oxygen transport membranes function at elevated temperatures, for instance between about 400° C. and about 1100° C. Typically extra heat must be supplied to oxygen transport membrane reactors to compensate for heat leak and cold end losses even when heat is recovered from product and waste streams. In larger plants this is provided by the combustion of fuel in in-line combustors or fired heaters. Typically, the combustor and oxygen transport membrane are separate units requiring separate high temperature containment vessels and several insulated high temperature pipe runs. Alternatively and/or in addition, reactive purges of a combustible reactant can be introduced to the anode side of the membrane to partially consume the permeated oxygen and thereby drive the separation while heating the oxygen transport membrane. In such case any remaining oxygen permeate contains combustion products.

As will be discussed, the present invention provides an oxygen transport membrane reactor and method in which there is no need for external piping runs and the like and the oxygen product is not contaminated by the combustion products.

SUMMARY OF THE INVENTION

The present invention provides an oxygen transport membrane reactor. A reactor vessel is provided with an elongated chamber and a feed inlet for introducing at least part of an oxygen containing feed into the chamber. A duct projects into one end of the chamber such that at least part of the incoming oxygen containing feed circulates along an outer surface of the duct and thereafter reverses direction and flows along the inside of the duct. An oxygen transport membrane projects into the duct, from the other end of the chamber, to separate part of the oxygen in the oxygen containing feed and thereby to form an oxygen depleted retentate in the duct and an oxygen permeate inside the oxygen transport membrane.

A fuel injector is located within the duct and downstream of the oxygen transport membrane for injecting fuel into the duct for combustion in the presence of a further part of the oxygen contained in the oxygen depleted retentate.

The at least part of the oxygen containing feed is thereby heated by indirect heat exchange as it passes along the outer surface of the duct. A fuel injector inlet to the reactor vessel is provided for introducing the fuel into the fuel injector. A combustion outlet of the reactor vessel is provided for discharging combustion gases produced by the combustion and a product outlet of the reactor vessel is provided in communication with the inside of the oxygen transport membrane for discharging a product.

Since the combustion utilizes oxygen in the oxygen depleted retentate and heats the incoming air through indirect heat transfer through the duct, products within the oxygen transport membrane do not become contaminated with combustion products. Moreover, since the entire reactor is integrated, there is no heat loss due to external piping runs and the like.

Preferably, baffles are located on the outer surface of the duct to increase the heat transferred to the oxygen containing feed.

Preferably the oxygen transport membrane is a closed end tube having a closed end and an open end. A heat transfer tube can be connected to the open end of the oxygen transport membrane and mounted within the reactor vessel. The reactor vessel can have a subsidiary feed inlet for introducing a subsidiary part of the oxygen containing feed outside the heat transfer tube to indirectly heat the subsidiary part of the oxygen containing feed and thereby cool the product. The reactor vessel can further have a set of baffles positioned within the reactor vessel to increase the heat transfer between the subsidiary part of the oxygen containing feed and the product.

In an alternative embodiment, the oxygen transport membrane projecting into the duct from the other end of the chamber is a first oxygen transport membrane. A second oxygen transport membrane is located within the duct, downstream of the oxygen transport membrane and enclosing the fuel injector. The second oxygen transport membrane can serve as a deoxo. In this type of device further oxygen from the oxygen depleted retentate permeates through the deoxo oxygen transport membrane to support combustion of the fuel within the fuel injector. Heat is then transferred from the combustion through the second oxygen transport membrane, through the duct wall and then to the incoming oxygen containing feed. In this regard, the combustion of the fuel inside the second (deoxo) oxygen transport membrane unit lowers the oxygen partial pressure to drive the separation. A retentate outlet is provided for discharging the oxygen depleted retentate after passage through the deoxo oxygen transport membrane tube. Thus, further oxygen can be separated from the feed to produce a purified product, for instance nitrogen. In such embodiment, as an alternate to baffles, a conical sleeve can be positioned within the chamber to impart an increase of velocity to the oxygen containing feed during heating to increase heat transfer coefficients.

The reactor vessel can be of elongated configuration. First, second and third mounting plates can be used to mount the fuel injector, the duct and the oxygen transport membrane, respectively, within the oxygen transport membrane reactor. The first, second and third mounting plates partition the oxygen transport membrane reactor into first, second, third and fourth compartments situated in an in-line relationship and with a first and fourth compartments located at opposite ends of the reactor vessel. The first and fourth compartments receive the fuel and collect the product from the inside of the oxygen transport membrane, respectively. The second compartment collects the combustion products. The chamber is defined by the third compartment.

In a further embodiment, the oxygen transport membrane mounted from the third mounting plate constitutes a first oxygen transport membrane. A fourth mounting plate can be interposed between the first and second mounting plates to mount a second oxygen transport membrane located within the duct, downstream of the oxygen transport membrane and enclosing the fuel injector to permeate the further oxygen from the oxygen depleted retentate and thereby to support combustion of the fuel. The second oxygen transport membrane can function as a deoxo. The fourth mounting plate further partitions the oxygen transport membrane reactor into a fifth compartment located between the second and third compartments for collecting the oxygen depleted retentate after passage along the second oxygen transport membrane tube. The fifth compartment having a retentate outlet for discharging the oxygen depleted retentate from the fifth compartment.

In another aspect, the present invention provides a method of separating oxygen from an oxygen containing feed. In accordance with the method, at least part of an oxygen containing feed is introduced into a reactor vessel. The at least part of the oxygen containing feed is circulated along an outer surface of a duct located within a chamber of the reactor vessel. Heat is transferred to the oxygen containing feed through indirect heat exchange while the oxygen containing feed passes along the outer surface of the duct. After circulating the oxygen containing feed along the outer surface of the duct, the oxygen containing feed is circulated inside the duct and in contact with an oxygen transport membrane projecting into the duct to heat the oxygen transport membrane and to separate part of the oxygen from the oxygen containing feed.

The separation of the oxygen produces an oxygen permeate inside the oxygen transport membrane and an oxygen depleted retentate outside of the oxygen transport membrane and within the duct. A fuel is introduced into the duct through a fuel injector located downstream of the oxygen transport membrane. The fuel is burned with combustion supported by a further part of the oxygen within the oxygen depleted retentate. This generates the heat for transfer to the oxygen containing feed and combustion products. The combustion products are discharged from the reactor vessel with the oxygen depleted retentate. A product is also discharged from the inside of the oxygen transport membrane and from the reactor vessel.

A subsidiary part of the oxygen containing feed can be introduced into the reactor vessel. Heat is indirectly transferred from the product to the subsidiary part of the oxygen containing feed to thereby cool the product. The subsidiary part of the oxygen containing feed can be combined with at least part of the oxygen containing feed after the at least part of the oxygen containing feed has been heated.

The method can further include the oxygen transport membrane projecting into the duct to be first oxygen transport membrane. The further oxygen can be permeated from the oxygen depleted retentate through a second oxygen transport membrane tube located within the duct, downstream of the first oxygen transport membrane. The second oxygen transport membrane tube encloses the fuel injector. The permeated oxygen supports combustion of the fuel.

BRIEF DESCRIPTION OF THE DRAWINGS

While the specification concludes with claims distinctly pointing out the subject matter that applicant regards as his invention, it is believed that the invention will be better understood when taken in connection with the accompanying drawings in which:

In order to avoid needless repetition, the same reference numbers have been used to designate elements illustrated in successive drawings that have been described in previous drawings.

DETAILED DESCRIPTION

Figure 1:
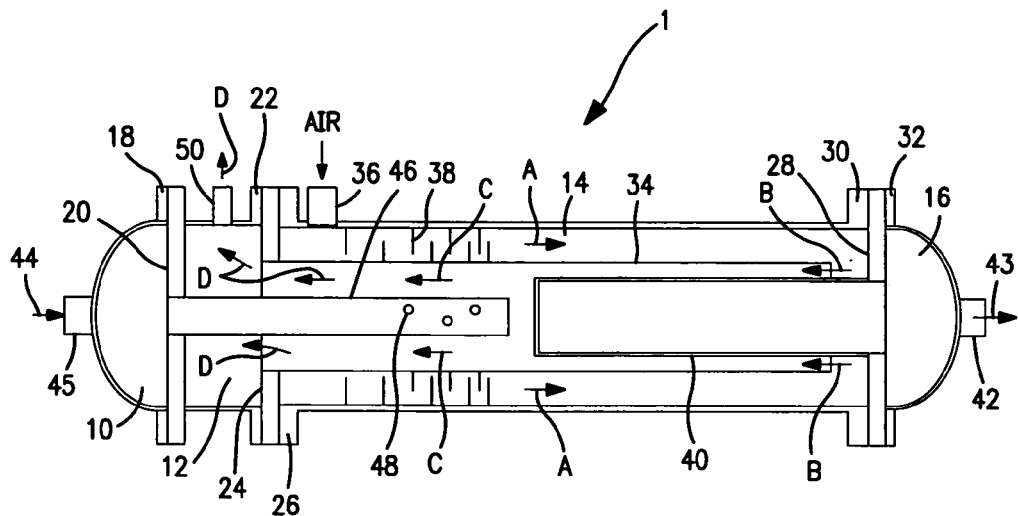
FIG. 1 is a schematic, sectional view of an oxygen transport membrane reactor for carrying a method in accordance with the present invention.

With reference to FIG. 1, an oxygen transport membrane reactor 1 is illustrated. Oxygen transport membrane reactor 1 contains an in-line arrangement of first, second, third and fourth chambers 10, 12, 14 and 16, respectively, to form an elongated, cylindrical vessel.

First chamber 10 is provided with an outer annular flange 18 that is connected to a mounting plate 20. Second chamber 12 has an outer annular flange 22 that connects to a mounting plate 24. Mounting plate 24 also connects to an annular flange 26 to form one end of third chamber 14. Although not illustrated, such connection, as well as other similar connections mentioned hereunder between flanges and flanges to mounting plates can be effectuated by way of a known annular arrangement of threaded connections or by welding. A mounting plate 28 is connected to and between annular flanges 30 and 32 to form the other end of third chamber 14 and chamber 16.

A duct 34 is connected to mounting plate 24 and projects into third chamber 14. An incoming oxygen containing feed, for instance, air, enters third chamber 14 through a feed inlet 36. Baffles 38 increase the degree of heat transfer between the incoming oxygen containing feed and the duct 34. As indicated by arrowhead "A", the oxygen containing feed flows on the outside surface of duct 34 and then reverses direction and flows, as indicated by arrowhead "B", on the inside of duct 34. Projecting into duct 34 is an oxygen transport membrane tube 40 which is connected to a mounting plate 42. The oxygen containing feed transfers part of its oxygen by transport through first oxygen transport membrane 40. The oxygen permeate is collected within fourth chamber 16 and is discharged through product outlet 42 as a product stream 43.

As can be appreciated, a catalyst could be applied on or adjacent to the outside surface of fuel injector tube 46 to cause a catalyzed oxidation reaction. The oxygen depleted retentate, indicated by arrowheads "C", is used to support combustion of a fuel 44 (for instance, natural gas) that is introduced into first chamber 10 through fuel inlet 45. Fuel collects in chamber 46 and is thereupon introduced into duct 34 by a fuel injector 46 which is connected to mounting plate 20. Fuel injector 46 can be a porous ceramic body or, as illustrated, a tube having holes 48 provided at one end thereof. The fuel is combusted within duct 34. Combustion is supported by the remaining oxygen within the oxygen depleted retentate. The resultant combustion products, indicated by arrowheads "D", are collected within second chamber 12 and discharged from a combustion outlet 50.

To avoid excessively high local temperatures it is advantageous to vary the local fuel injection rate by appropriate variable spacing of orifices or varying the thickness or porosity of an alternate porous fuel injection tube, from a small value at the hot end of the heat exchanger to a larger value at its cold end.

Figure 2:
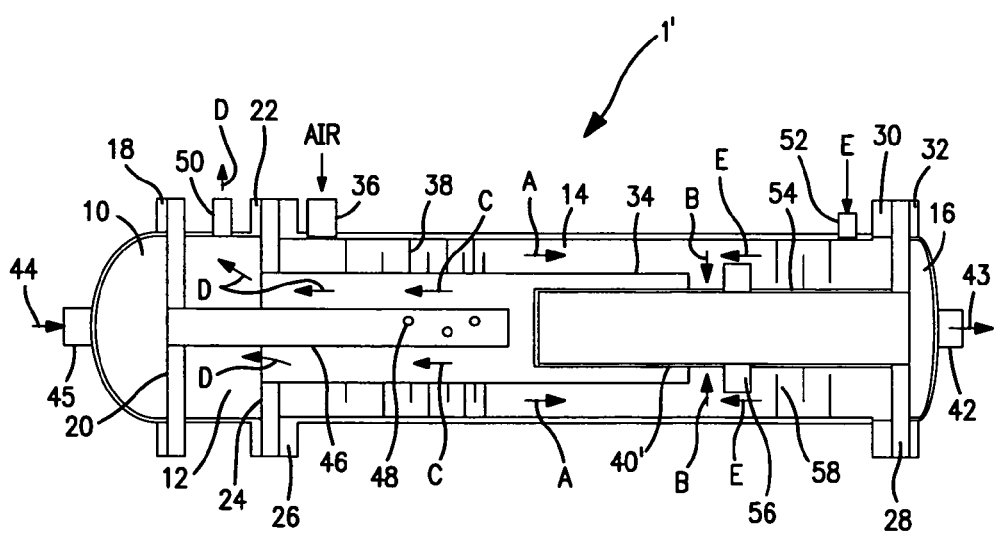
FIG. 2 is an alternative embodiment of FIG. 1.

With reference to FIG. 2, an oxygen transport membrane reactor 1' is illustrated in which the product is cooled against heating part of the incoming oxygen containing feed. In all other respects the layout of oxygen transport membrane reactor 1' is identical to oxygen transport membrane reactor 1. In accordance with this embodiment, third chamber 14 has an inlet 52 for introducing a subsidiary oxygen containing stream, indicated by arrowheads "E", into chamber 14. A first tubular oxygen transport membrane 40' is attached to a heat transfer tube 54 by way of a floating mounting plate 56. Floating mounting plate 56 can be welded to heat transfer tube 54. First tubular oxygen transport membrane 40' is then connected to floating mounting plate 56 in any of known mounting techniques, for example, mounting techniques that are used to connect oxygen transport membrane tubes to tubesheets.

The product in the interior of first oxygen transport membrane 40' flows into heat transfer tube 54 in which it indirectly exchanges heat with the subsidiary oxygen containing stream "E". As a result, the product cools while the subsidiary oxygen containing stream "E" is heated.

The subsidiary oxygen containing stream "E" mixes with the incoming oxygen containing stream introduced into third chamber 14 via inlet 36 and enters duct 34. Heat transfer between the subsidiary oxygen containing stream "E" and the product flowing through heat transfer to 54 can be increased by the provision of baffles 58.

Figure 3:
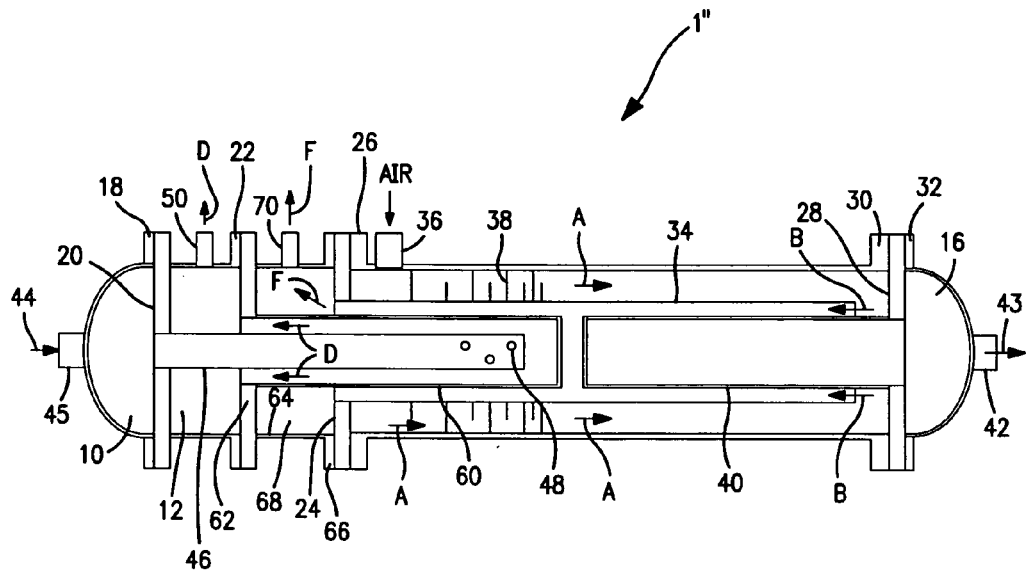
FIG. 3 is another alternative embodiment of FIG. 1.

With reference to FIG. 3 an oxygen transport membrane reactor 1" is illustrated that is very similar to the previous reactors discussed above. Oxygen transport membrane reactor 1" can be distinguished from the foregoing reactors by the provision of a second oxygen transport membrane 60 that encloses the fuel injector 46. A further part of the oxygen that is not transported through oxygen transport membrane 40 is transported through second oxygen transport membrane 60, which is another oxygen transport membrane, similar to but not identical to first oxygen transport membrane 40.

Second oxygen transport membrane will feature material compositions that are stable at very low oxygen partial pressures (as, for instance, described in U.S. Pat. No. 5,306,411) whereas first oxygen transport membrane will feature material compositions with high ion and electron conductivities at higher oxygen partial pressures (as, for instance, described in U.S. Pat. No. 5,648,304). The combustion of fuel within deoxo oxygen transport membrane 60 consumes oxygen as soon as it is transported to create a very low oxygen partial pressure on the anode side of such membrane. This drives the further separation of oxygen from the oxygen containing feed. As a result, a further product that is lean in oxygen can be produced. For instance, if the oxygen containing feed is air, a nitrogen enriched product can be produced.

Second oxygen transport membrane 60 is mounted on a mounting plate 62 which is in turn connected to flange 22 associated with second chamber 12. Second chamber 12 is provided with combustion outlet 50 for discharging the combustion products, indicated by arrowheads "D". Mounting plate 62 is in turn connected to a cylindrical shell 64 which has an end flange 66 which is connected to mounting plate 24 that is used to mount shroud to 34. As a result a fifth chamber 68 is defined between mounting plate 62 and mounting plate 24 that is used to collect the oxygen lean product, designated by arrowheads "F", which is discharged from the retentate outlet 70.

It is important to control local heat removal from the combustion to avoid either quenching the oxygen transport by excessive heat dissipation or overheating of the second oxygen transport membrane tube if excessive or insufficient heat respectively is transferred. Varying local heat transfer rates from the combustion space to the incoming air by control of baffle spacing can provide low local heat transfer coefficients where the temperature difference is large and high heat transfer coefficients where the temperature difference is small.

A catalyst could be located inside or adjacent to the inside surface of second OTM tube 60. The catalyst could be tailored to support combustion or other oxidation reactions. In the latter case, the product stream 43 would be the product of such oxidation reactions instead of oxygen. The catalyst could also be a reforming catalyst. In that case, with addition of steam and or carbon dioxide to fuel stream 4, the product of combined oxidation and reforming reactions would be a syngas.

The direction of fuel and combustion products flows can be reversed from co-current (with respect to the direction of retentate flow) shown in FIG. 3 to counter-current. In that case fuel enters via nozzle 50 and combustion products leave via nozzle 44. Counter-current flow can have some advantage in a Deoxo case since it reduces the driving force pinch.

Figure 4:
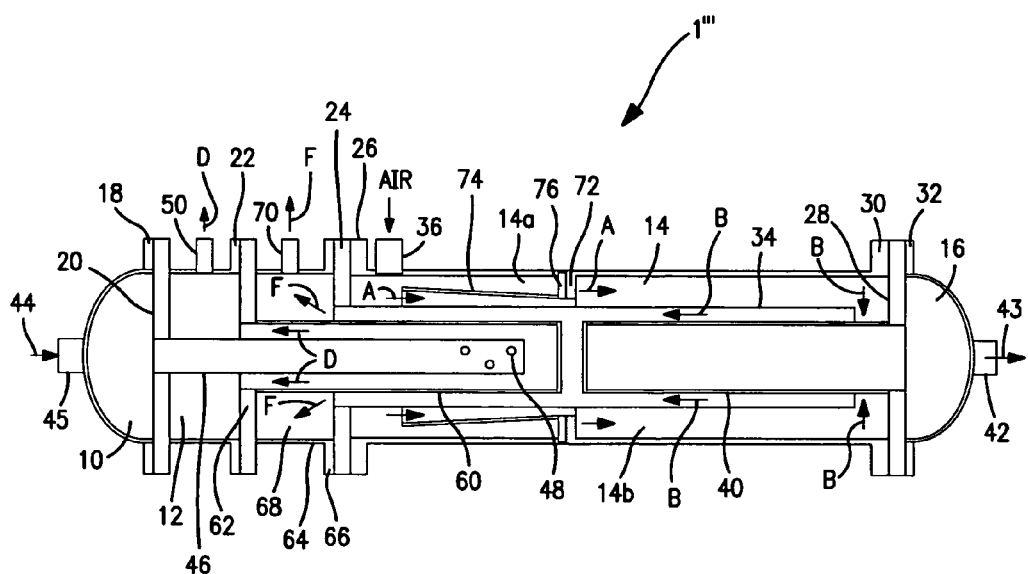
FIG. 4 is an alternative embodiment of FIG. 3.

With reference to FIG. 4 an oxygen transport membrane reactor 1''' is disclosed that is in most major respects identical to oxygen transport membrane reactor 1", discussed above. This reactor has the third chamber 14 divided into sections 14a and 14b by way of an internal mounting plate 72. A conical flow passage 74 having an annular flange 76 mounts to mounting plate 72. The incoming oxygen containing feed is thus forced to flow through an ever decreasing area. By virtue of Bernouillis law, the velocity of the oxygen containing feed increases. With the gradual increase in velocity and narrowing of the flow passage there is a consequent gradual increase in heat transfer coefficients.

As may be appreciated, the drawings show single tube assemblies for clarity. Those skilled in the art can appreciate that the concept can be readily extended to multi-tube devices in which case the mounting plates would constitute tube sheets. Also some details, such as internal insulation, seals and mechanical attachments are not shown. Suitable seal designs are shown in U.S. Pat. No. 6,139,810.

While the present invention has been described with reference to preferred embodiments, as will be understood, numerous changes and additions and omissions may be made without departing from the spirit and the scope of the present invention.

What is claimed is:

1. An oxygen transport membrane reactor comprising:
a reactor vessel having an elongated chamber and a feed inlet for introducing at least part of an oxygen containing feed into the chamber;
a duct projecting into one end of the chamber such that the at least part of an incoming oxygen containing feed circulates along an outer surface of said duct and thereafter reverses direction and flows along the inside of the duct;
an oxygen transport membrane projecting into the duct, from the other end of the chamber, to separate part of the oxygen in the oxygen containing feed and thereby to form an oxygen depleted retentate in the duct and an oxygen permeate inside the oxygen transport membrane;
a fuel injector located within duct and downstream of the oxygen transport membrane for injecting fuel into the duct for combustion in the presence of a further part of the oxygen contained in the oxygen depleted retentate, thereby to heat the at least part of the oxygen containing feed by indirect heat exchange as it passes along the outer surface of the duct;
a fuel injector inlet to the reactor vessel for introducing the fuel into the fuel injector;
a combustion outlet of the reactor vessel for discharging combustion gases produced by the combustion; and
a product outlet of the reactor vessel in communication with the inside of the oxygen transport membrane for discharging a product.

2. The oxygen transport membrane reactor of claim 1 further comprising baffles located at the outer surface of the duct to increase the heat transferred to the oxygen containing feed.

3. The oxygen transport membrane reactor of claim 1, wherein the oxygen transport membrane is a closed end tube having a closed end and open end.

4. The oxygen transport membrane reactor of claim 3, further comprising:
a heat transfer tube connected to the open end of the oxygen transport membrane and mounted within the reactor vessel; and
the reactor vessel having a subsidiary feed inlet for introducing a subsidiary part of the oxygen containing feed outside the heat transfer tube to indirectly heat said subsidiary part of the oxygen containing feed and thereby cool the product.

5. The reactor vessel of claim 4, further comprising a set of baffles positioned within the reactor vessel to increase the heat transfer between the subsidiary part of the oxygen containing feed and the permeated oxygen.

6. The oxygen transport membrane reactor of claim 1, wherein:
the oxygen transport membrane projecting into the duct from the other end of the chamber is a first oxygen transport membrane;
a second oxygen transport membrane is located within the duct, downstream from the oxygen transport membrane and enclosing the fuel injector to permeate the further oxygen from the oxygen depleted retentate and thereby to support combustion of the fuel; and
a retentate outlet for discharging the oxygen depleted retentate after passage along the deoxo oxygen transport membrane tube.

7. The oxygen transport membrane reactor of claim 6, further comprising a conical sleeve forming a gradually narrowing flow channel to impart an increase of velocity to the oxygen containing feed and heat transfer coefficients during heating.

8. The oxygen transport membrane reactor of claim 1, further comprising:
the reactor vessel being of elongated configuration;
first, second, and third mounting plates to mount the fuel injector, the duct and the oxygen transport membrane, respectively, within the oxygen transport membrane reactor;
the first, second and third mounting plates partitioning the oxygen transport membrane reactor into first, second, third, and forth compartments situated in the in-line relationship and with the first and forth compartments located at opposite ends of said reactor vessel;
the first and fourth compartments receiving the fuel and collecting the product from the open end of the oxygen transport membrane, respectively;
the second compartment collecting the combustion products; and
the chamber being defined by the third compartment.

9. The oxygen transport membrane reactor of claim 8, further comprising:
the oxygen transport membrane mounted from the third mounting plate constituting a first oxygen transport membrane;
a fourth mounting plate, interposed between the first and second mounting plates to mount a second oxygen transport membrane located within the duct, located downstream from the oxygen transport membrane and enclosing the fuel injector to permeate the further oxygen from the oxygen depleted retentate and thereby to support combustion of the fuel;
the fourth mounting plate further partitioning the oxygen transport membrane reactor into a fifth compartment located between the second and third compartments for collecting the oxygen depleted retentate after passage along the first deoxo oxygen transport membrane tube; and
the fifth compartment having a retentate outlet for discharging the oxygen depleted retentate from the forth compartment.

10. A method of separating oxygen from an oxygen containing feed comprising:
introducing at least part of an oxygen containing feed into a reactor vessel
circulating the at least part of the oxygen containing feed along an outer surface of a duct located within a chamber of the reactor vessel;
transferring heat to the oxygen containing feed through indirect heat exchange while the oxygen containing feed passes along the outer surface of the duct;
after circulating the oxygen containing feed along the outer surface of the duct, circulating the oxygen containing feed inside the duct and in contact with an oxygen transport membrane projecting into the duct to heat the oxygen transport membrane tube and to separate part of the oxygen from the oxygen containing feed, thereby to form an oxygen permeate inside the oxygen transport membrane and an oxygen depleted retentate outside the oxygen transport membrane and within the duct;
introducing a fuel into the duct through a fuel injector located downstream of the oxygen transport membrane;
burning the fuel with combustion supported by a further part of the oxygen within the oxygen depleted retentate, thereby to generate the heat for transfer to the oxygen containing feed and combustion products;

discharging the combustion products from the reactor vessel; and discharging a product from an open end of the oxygen transport membrane tube, located opposite to the closed end thereof, and from the reactor vessel.

11. The method of claim 10, further comprising:

introducing a subsidiary part of the oxygen containing feed into the reactor vessel and indirectly transferring heat from the product to the subsidiary part of the oxygen containing feed and thereby to heat said subsidiary part of the oxygen containing feed and thereby cool the product; and combining the subsidiary part of the oxygen containing feed with the at least part of the oxygen containing feed after the at least part of the oxygen containing feed has been heated.

12. The method of claim 10, wherein:

the oxygen transport membrane projecting into the duct is a first oxygen transport membrane; and the further oxygen from the oxygen depleted retentate is permeated through a second oxygen transport membrane located within the duct, downstream of the first oxygen transport membrane, and enclosing the fuel injector, thereby to support combustion of the fuel.

* * * * *